(12) United States Patent
Dolan et al.

(10) Patent No.: US 8,873,864 B2
(45) Date of Patent: Oct. 28, 2014

(54) METHODS AND SYSTEMS FOR AUTOMATIC CONTENT-BOUNDARY DETECTION

(75) Inventors: John E. Dolan, Vancouver, WA (US); Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 349 days.

(21) Appl. No.: 12/639,895

(22) Filed: Dec. 16, 2009

(65) Prior Publication Data

US 2011/0142341 A1 Jun. 16, 2011

(51) Int. Cl.
G06K 9/48 (2006.01)
G06T 7/00 (2006.01)
G06K 9/32 (2006.01)

(52) U.S. Cl.
CPC ..... G06K 9/3275 (2013.01); G06T 2207/10008 (2013.01); G06T 2207/30176 (2013.01); G06T 7/0083 (2013.01)
USPC .......................................... 382/199; 382/266

(58) Field of Classification Search
USPC ........................ 382/199, 260–266, 289, 290
See application file for complete search history.

(56) References Cited

U.S. PATENT DOCUMENTS

| 5,335,290 A * | 8/1994 | Cullen et al. ................ 382/176 |
| 5,452,374 A * | 9/1995 | Cullen et al. ................ 382/293 |
| 5,465,304 A * | 11/1995 | Cullen et al. ................ 382/176 |
| 5,528,387 A | 6/1996 | Kelly et al. |
| 5,781,665 A | 7/1998 | Cullen et al. |
| 5,828,776 A * | 10/1998 | Lee et al. ................ 382/133 |
| 5,854,854 A * | 12/1998 | Cullen et al. ................ 382/176 |
| 5,880,858 A | 3/1999 | Jin |
| 5,892,854 A | 4/1999 | de Queiroz et al. |
| 5,901,253 A | 5/1999 | Tretter |
| 5,974,199 A | 10/1999 | Lee et al. |
| 5,978,519 A | 11/1999 | Bollman et al. |
| 6,011,635 A | 1/2000 | Bungo et al. |
| 6,043,823 A | 3/2000 | Kodaira et al. |
| 6,201,901 B1 | 3/2001 | Zhou et al. |
| 6,282,326 B1 * | 8/2001 | Lee et al. ................ 382/289 |
| 6,298,157 B1 | 10/2001 | Wilensky |
| 6,310,984 B2 * | 10/2001 | Sansom-Wai et al. ........ 382/289 |
| 6,360,026 B1 | 3/2002 | Kulkarni et al. |

(Continued)

FOREIGN PATENT DOCUMENTS

| JP | 2006-163821 A | 6/2006 |
| JP | 2008-305099 A | 12/2008 |

OTHER PUBLICATIONS

Japanese Office Action—Patent Application No. 2010-263891—Mailing Date Feb. 14, 2012.

(Continued)

*Primary Examiner* — Brian Le

(74) *Attorney, Agent, or Firm* — Kristine Elizabeth Matthews; David C. Ripma

(57) ABSTRACT

Aspects of the present invention are related to systems and methods for automatic content-boundary detection in a digital image. According to one aspect of the present invention a received image may be preconditioned to form a normalized image from which image-content edges may be detected. Projection histograms in the direction of a known skew angle associated with the image and the normal to the skew angle may be formed to determine image-content boundaries.

22 Claims, 12 Drawing Sheets

(56) References Cited

U.S. PATENT DOCUMENTS

| | | | |
|---|---|---|---|
| 6,373,590 B1 * | 4/2002 | Ancin et al. | 358/1.18 |
| 6,430,320 B1 | 8/2002 | Jia et al. | |
| 6,556,721 B1 | 4/2003 | Wang et al. | |
| 6,560,376 B2 | 5/2003 | Kimbell et al. | |
| 6,674,919 B1 * | 1/2004 | Ma et al. | 382/289 |
| 6,901,168 B1 | 5/2005 | Gardes et al. | |
| 6,956,587 B1 | 10/2005 | Anson | |
| 6,973,222 B2 | 12/2005 | Haeberli | |
| 6,987,880 B2 | 1/2006 | Dolan et al. | |
| 7,034,848 B2 | 4/2006 | Sobol | |
| 7,068,855 B2 | 6/2006 | Simske et al. | |
| 7,133,050 B2 | 11/2006 | Schowtka | |
| 7,133,571 B2 * | 11/2006 | Cheatle | 382/282 |
| 7,209,149 B2 | 4/2007 | Jogo | |
| 7,305,146 B2 | 12/2007 | Cheatle | |
| 2001/0005867 A1 | 6/2001 | Zhou et al. | |
| 2001/0007116 A1 | 7/2001 | Zhou et al. | |
| 2005/0168775 A1 | 8/2005 | Liu | |
| 2005/0244079 A1 | 11/2005 | Lin et al. | |
| 2006/0072847 A1 | 4/2006 | Chor et al. | |
| 2006/0098844 A1 | 5/2006 | Luo | |
| 2006/0109282 A1 | 5/2006 | Lin et al. | |
| 2006/0188173 A1 | 8/2006 | Zhang et al. | |
| 2006/0228044 A1 | 10/2006 | Yeh et al. | |
| 2006/0280364 A1 | 12/2006 | Ma et al. | |
| 2007/0013974 A1 | 1/2007 | Hattori | |
| 2007/0076979 A1 | 4/2007 | Zhang et al. | |
| 2009/0180694 A1 | 7/2009 | Chen | |
| 2010/0014774 A1 * | 1/2010 | Chen et al. | 382/266 |
| 2011/0142341 A1 | 6/2011 | Dolan et al. | |

OTHER PUBLICATIONS

USPTO Office Action—U.S. Appl. No. 12/175,386—Mailing Date Aug. 17, 2011.

USPTO Office Action—U.S. Appl No. 12/175,386—Mailing Date Feb. 17, 2012.

* cited by examiner

US 8,873,864 B2

METHODS AND SYSTEMS FOR AUTOMATIC CONTENT-BOUNDARY DETECTION

FIELD OF THE INVENTION

Embodiments of the present invention relate generally to image processing and, in particular, comprise methods and systems for automatic detection of content boundaries in a digital image.

BACKGROUND

It may be desirable to crop off extraneous portions of a digital page, also considered a digital image, a digital document and an image. In particular, it may be desirable to retain the content of the digital page while eliminating extraneous page margins, for example, the region of the digital page corresponding to the platen backing when the digital page is generated by a scanning process. Exemplary applications in which this may be useful include applications in which the page content may be repositioned on a page of a different size than the original page, applications in which the page content may be composited with additional material and other document layout applications. It may be desirable to perform cropping automatically without user interaction. It also may be desirable to perform cropping on a digital page comprising an arbitrarily shaped content region, and it may be desirable to perform cropping when the digital page content is skewed with respect to the orthogonal image axes. Methods and systems for automatically determining content boundaries, therefore, may be desirable.

SUMMARY

Some embodiments of the present invention comprise methods and systems for automatic detection of content boundaries in a digital image.

In some embodiments of the present invention, a content-boundary detection system may comprise an image receiver that receives an input image and a skew-information receiver that receives skew information related to the input image. In some embodiments of the present invention, an image receiver may provide an input image to an image preconditioner. The image preconditioner may precondition the input image to a normalized format which may allow consistent and uniform processing. The image preconditioner may provide the normalized, also considered preconditioned, image to an edge detector. The edge detector may provide, to a projection-histogram generator, edge points that have been detected from the normalized image. The projection-histogram generator may generate two projection histograms using the edge points provided by the edge detector and the skew information provided by the skew-information receiver. The edge points and the projection histograms may be provided to a boundary estimator that may estimate bounding lines. A bounding-line intersector may determine bounding corners from the bounding lines provided by the boundary estimator. In some embodiments, the bounding corners may be made available to other systems and processes by the content-boundary detection system. In alternative embodiments, the bounding lines may be made available to other systems and processes.

Alternative embodiments of the present invention may comprise a method executed in a computing system comprising at least one computing device. Some of these embodiments may comprise receiving an input image and skew information in a computing system and preconditioning the input image to a normalized format. The location of edges in the normalized, also considered preconditioned, image may be determined and projection histograms formed based on the edges and the skew information. The projection histograms and edge points may be used to estimate oriented boundaries which may be used to determine bounding corners and bounding lines.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but the following more detailed description is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Determination of a content boundary in a digital page, also considered a digital image, a digital document and an image, may be useful for many applications. It may be desirable to crop off extraneous portions of a digital page. In particular, it may be desirable to retain the content of the digital page while eliminating extraneous page margins, for example, the region of the digital page corresponding to the platen backing when the digital page is generated by a scanning process. Exemplary applications in which this may be useful include applications in which the page content may be repositioned on a page of a different size than the original page, applications in which the page content may be composited with additional material and other document layout applications.

It may be desirable to detect a content boundary automatically without user interaction. It may be desirable to detect a content boundary when the digital page content is skewed with respect to the orthogonal image axes, and it may be desirable to detect a content boundary when the digital page contains significant noise.

Embodiments of the present invention comprise methods and systems for automatically detecting a content boundary in a digital page in the presence of skew and/or noise.

Figure 1:
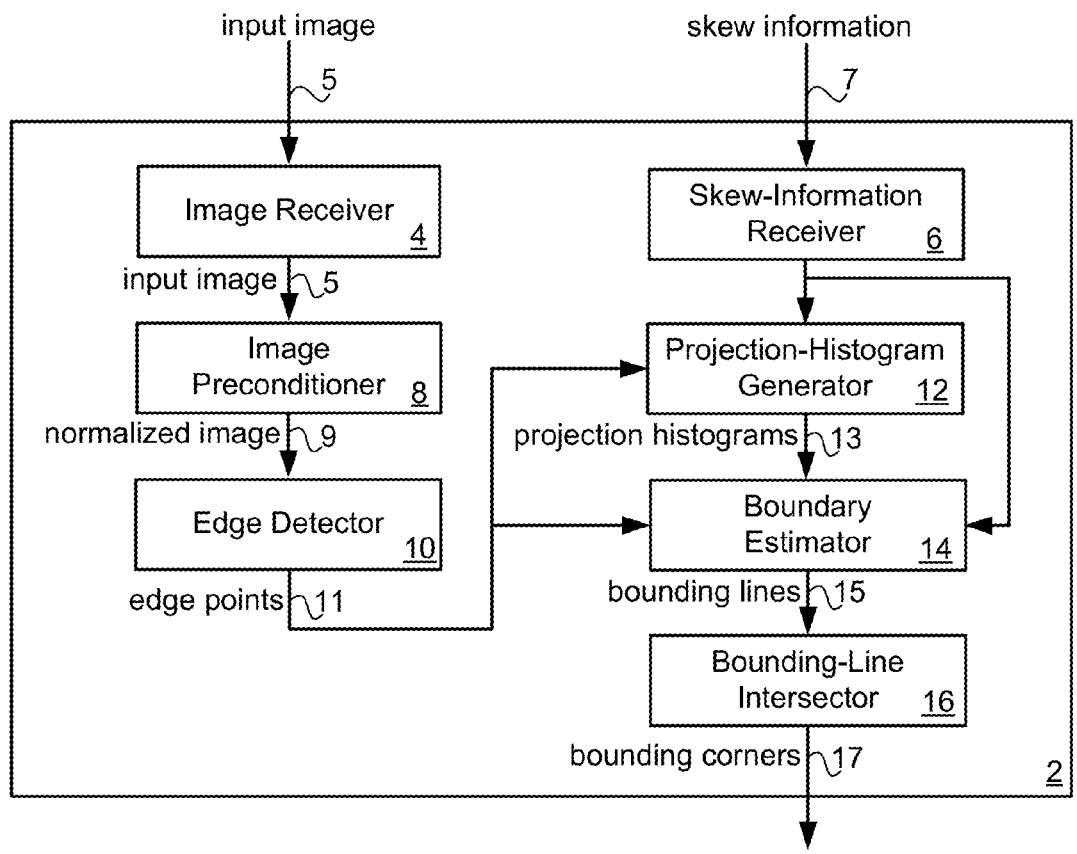
FIG. 1 is a chart showing exemplary embodiments of the present invention comprising an image receiver, a skew-information receiver, an image preconditioner, an edge detector, a projection-histogram generator, a boundary estimator and a bounding-line intersector.

In exemplary embodiments of the present invention described in relation to FIG. 1, a content-boundary detection system 2 may comprise an image receiver 4 that receives an input image 5 and a skew-information receiver 6 that receives skew information 7 related to the input image 5. In some embodiments, the input image 5 may comprise an image generated by a scanning process. In alternative embodiments, the input image 5 may comprise an otherwise-generated image. In some embodiments, the input image 5 may be a high-resolution image, for example, an image of 300 DPI (dots per inch), or greater. In some embodiments, the skew information 7 may comprise an estimate of a local document coordinate system relative to a scan axes.

The image receiver 4 may provide the input image 5 to an image preconditioner 8. The image preconditioner 8 may precondition the input image 5 to a normalized format which may allow consistent and uniform processing. The image preconditioner 8 may provide the normalized, also considered preconditioned, image 9 to an edge detector 10. The edge detector 10 may provide, to a projection-histogram generator 12, edge points 11 that have been detected from the normalized image 9. The projection-histogram generator 12 may generate two projection histograms 13 using the edge points 11 provided by the edge detector 10 and the skew information 7 provided by the skew-information receiver 6. The edge points 11 and the projection histograms 13 may be provided to a boundary estimator 14 that may estimate bounding lines 15. A bounding-line intersector 16 may determine bounding corners 17 from the bounding lines 15 provided by the boundary estimator 14. In some embodiments, the bounding corners 17 may be made available to other systems and processes by the content-boundary detection system 2. In alternative embodiments (not shown), the bounding lines 15 may be made available to other systems and processes.

Figure 2:
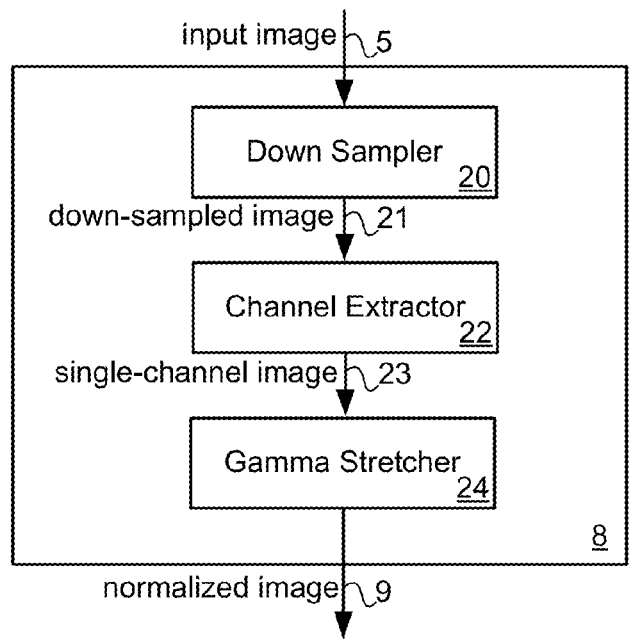
FIG. 2 is a chart showing exemplary embodiments of the image preconditioner shown in FIG. 1.

Referring to FIG. 1 and FIG. 2, in some embodiments of the present invention, an image preconditioner 8 may comprise a down sampler 20, a channel extractor 22 and a gamma stretcher 24. In some of these embodiments, the input image 5 made available to the image preconditioner 8 by the image receiver 4 may be down-sampled, for example, from a resolution of 300 DPI to a resolution of 75 DPI, by the down sampler 20. The down-sampled image 21 may be provided, by the down sampler 20, to the channel extractor 22, and a single channel 23, for example, the blue channel or the luminance channel, may be extracted by the channel extractor 22 for further processing. The single-channel image 23 provided, by the channel extractor 22, to the gamma stretcher 24 may be gamma stretched, for example, to a gamma value of two, by a gamma stretcher 24 to increase the discriminative range of the content-portion of the input image 5 and to form the normalized image 9. The normalized image 9 may be made available by the image preconditioner 8 to other components of the content-boundary detection system 2.

A person of ordinary skill in the art will appreciate that other configurations of the down sampler 20, the channel extractor 22 and the gamma stretcher 24 may be employed to accomplish the functionality of the image preconditioner 8. For example, in alternative embodiments (not shown), a single-channel image may be extracted by a channel extractor from an input image. The single-channel image may down sampled by a down sampler, and the down-sampled, single-channel image may be gamma stretched by a gamma stretcher. By way of further example, in yet alternative embodiments (not shown), a single-channel image may be extracted by a channel extractor. The single-channel image may be gamma stretched by a gamma stretcher, and the single-channel, gamma-stretched image may be down sampled by a down sampler.

Figure 3:
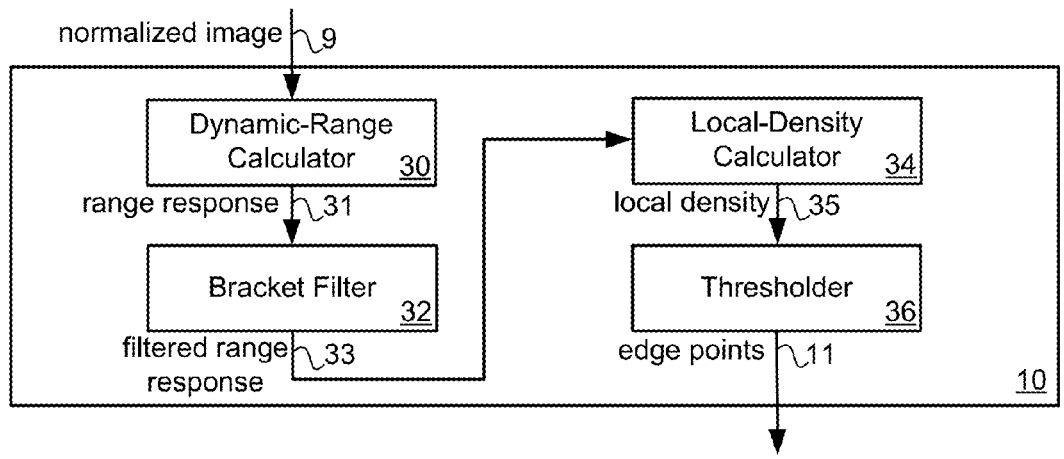
FIG. 3 is a chart showing exemplary non-oriented edge detector embodiments of the edge detector shown in FIG. 1.

Referring to FIG. 1 and FIG. 3, in some embodiments of the present invention, an edge detector 10 may comprise a dynamic-range calculator 30, a bracket filter 32, a local-density calculator 34 and a thresholder 36. In these embodiments, the edge detector 10 may perform non-oriented edge detection. The dynamic-range calculator 30 may compute a local dynamic range at each pixel in a normalized image 9 provided by an image preconditioner 8. At each pixel location in the normalized image 9, the dynamic range of a local neighborhood associated with the pixel location, which may be denoted (i, j), may be determined according to:

$$rng_N(i,j) = \max(p) - \min(p), \forall p \in N,$$

where N denotes the local neighborhood, for example, a 5×5 neighborhood centered on the pixel location for which the dynamic range is being determined and p denotes an image value at a pixel. A range response 31 comprising the local dynamic range determined at each pixel in the normalized image 9 may be made available to a bracket filter 32. The bracket filter 32 may retain only significant range values from the range response 31 to generate a filtered range response 33 which may be made available to a local-density calculator 34. Range values below a lower threshold value may reflect quasi-uniform regions, and may be considered non-edges. Range values above an upper threshold may likely be the result of document image content or markings on the platen backing, in the case of a scanned image, and may be stronger than an expected range for a document boundary transition. In some embodiments of the present invention comprising a 5×5 neighborhood for dynamic-range calculation, the bracket filter 32 may be realized according to:

$$rng'(i, j) = \begin{cases} 1, & 7 \le rng_N(i, j) \le 30 \\ 0, & \text{otherwise,} \end{cases}$$

where rng'(i, j) may denote the filtered range response at pixel location (i, j). In general, the bracket filter 32 may be realized according to:

$$rng'(i, j) = \begin{cases} 1, & TH_{lower} \le rng_N(i, j) \le TH_{upper} \\ 0, & \text{otherwise,} \end{cases}$$

where $TH_{lower}$ and $TH_{upper}$ may denote a lower threshold and an upper threshold, respectively. The threshold values may be based on the neighborhood configuration used in the dynamic-range calculator 30. The filtered range response 33 may be provided to a local-density calculator 34 which may compute the local density of significant range values 33. A neighborhood proximate to a pixel location (i, j) may be used to determine the local density. In some embodiments, the neighborhood may be the same neighborhood used in the dynamic-range calculator 30. In alternative embodiments, the neighborhood may be a different neighborhood than that used in the dynamic range calculator 30. For a given neighborhood, which may be denoted $N_{LD}$, the local density at a pixel location (i, j) may be determined, in some embodiments, according to:

$$den_N(i, j) = \sum_{\forall p \in N_{LD}} rng'(p).$$

In some embodiments, the local-density neighborhood, $N_{LD}$, may be a 5×5 window centered on the pixel for which the local density is being calculated. The local density 35 may be provided to a thresholder 36 which may threshold the resulting local density 35 from the local-density calculator 34 to retain only points of sufficient density. Points of sufficient density may comprise points with sufficient local support to be likely document-boundary transitions. The thresholded response, also considered edge points 11 at a pixel location (i, j) may be determined according to:

$$den'_{N_{LD}}(i, j) = \begin{cases} 1, & den_{N_{LD}}(i, j) > \mu \\ 0, & \text{otherwise,} \end{cases}$$

where μ may denote a density threshold. In some embodiments of the present invention, the density threshold may be the mean of the global density or another function of the global density. The edge points 11 may be made available by the edge detector 10 to other system components of the content-boundary detection system 2. In alternative embodiments, the local density at a pixel location (i, j) may be determined only at those pixel locations (i, j) where rng'(i, j)=1. These embodiments may have less computation cost at the expense of performance. Still alternative embodiments (not shown) may not have a local-density calculator 34 and a thresholder 36, and the filtered range response 33 may be made directly available to other parts of the system as edge points 11.

Referring to FIG. 1, the projection-histogram generator 12 may compute projection histograms 13 using the edge points 11 provided by the edge detector and the skew information 7 provided by the skew-information receiver 6. The projection-histogram generator 12 may compute a projection histogram in each of the directions indicated by the skew information 7. Denoting the skew information as an input rotation vector and its normal, $rvec=[r_x \, r_y]$ and $vvec=rvec^\perp=[-r_y \, r_x]$, respectively, then a point vector of all possible boundary locations may be given by:

$$pvec=[(xy)^T | den'(x,y)=1].$$

A top-bottom projection and a left-right projection of a point may be computed according to:

$$TB_{proj}=vvec \otimes pvec$$

and $$LR_{proj}=rvec \otimes pvec,$$

respectively, where ⊗ denotes matrix multiplication. The projection-histogram generator 12 may compute a top-bottom boundary histogram and a right-left boundary histogram by accumulating the projection values. The projection-histogram generator 12 may provide the projection histograms 13 to a boundary estimator 14.

Figure 4:
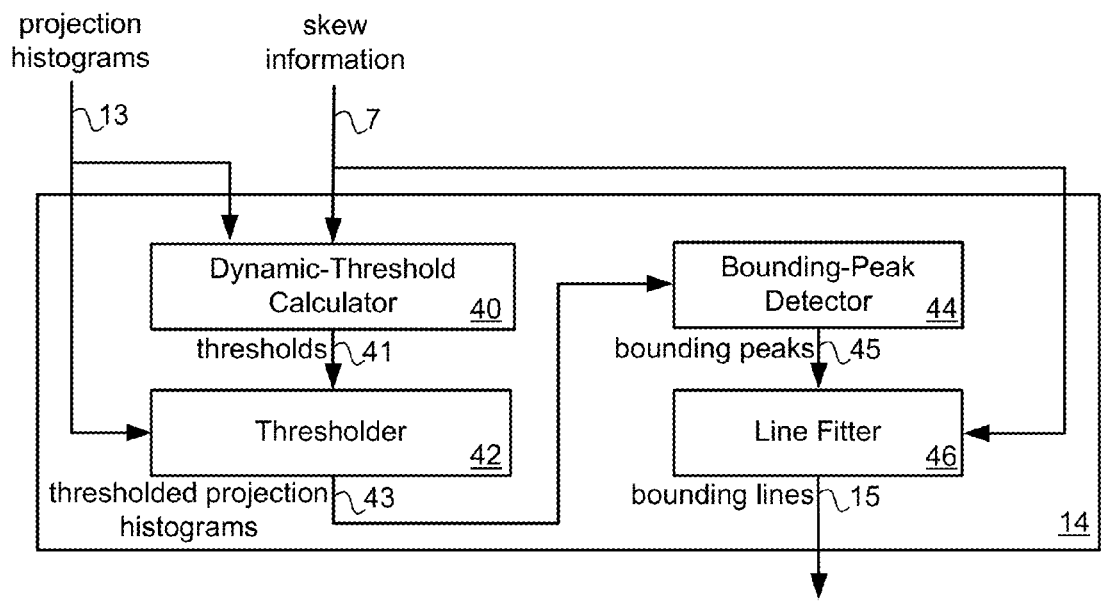
FIG. 4 is a chart showing exemplary embodiments of the boundary estimator shown in FIG. 1.

Referring to FIG. 1 and FIG. 4, a boundary estimator 14 may comprise a dynamic-threshold calculator 40, a thresholder 42, a bounding-peak detector 44 and a line fitter 46. The dynamic-threshold calculator 40 may compute a threshold associated with each projection histogram 13 to suppress non-documents peaks in the respective projection histogram. In some embodiments of the present invention, the threshold associated with a projection histogram may be a function of the mean of the projection-histogram counts and the global density ratio. In some of these embodiments, the threshold associated with the top-bottom-boundary projection histogram may be determined according to:

$$\theta_{TB}=\gamma \cdot \mu_{TB} \cdot \log(\Delta),$$

and the threshold associated with the left-right-boundary projection histogram may be determined according to:

$$\theta_{LR}=\gamma \cdot \mu_{LR} \cdot \log(\Delta),$$

where $\mu_{TB}$ and $\mu_{LR}$ may denote the respective mean histogram counts and where $\gamma=0.8$, in an exemplary embodiments, and $$\Delta = \frac{\sum_{\forall pixels} den' = 1}{\sum_{\forall pixels} den' = \{0, 1\}}.$$

The thresholds 41 determined by the dynamic-threshold calculator 40 may be made available to a thresholder 42 which may threshold a projection histogram thereby suppressing values below the associated threshold by setting to zero the count of any histogram bin with a count below the threshold. The thresholder 42 may provide the thresholded projection histograms 43 to a bounding-peak detector 44. The bounding-peak detector may identify significant bounding peaks in each of the thresholded projection histograms 43. A top peak may be identified by locating the first, also considered leading, locally-maximum bin in the thresholded top-bottom-boundary projection histogram. A left peak may be identified by locating the first, also considered leading, locally-maximum bin in the thresholded left-right-boundary projection histogram. A bottom peak may be identified by locating the last, also considered trailing, locally-maximum bin in the thresholded top-bottom-boundary projection histogram. A right peak may be identified by locating the last, also considered trailing, locally-maximum bin in the thresholded left-right-boundary projection histogram. A leading local-maximum bin may be a bin for which the bin count is larger than that of any preceding bin and for which there is at least one succeeding bin with a smaller count before there is a larger count. A trailing local-maximum bin may be identified processing the histogram signal in the reverse order using the same process. In some embodiments, a first derivative may be computed for a histogram. A leading peak may be associated with the first bin where the derivative is negative. A trailing bin may be associated with the last bin where the derivative changes from positive to negative. The top, bottom, left and right peak locations may be denoted by $c_T$, $c_B$, $c_L$ and $c_R$, respectively. The line fitter 46 may produce bounding lines 15 using the peak locations 45 provided by the bounding-peak detector 44. The line fitter 46 may also use the skew information 7 to fit the bounding lines. In some embodiments, the bounding lines 15 may be determined according to:

top bounding line: $-r_y x + r_x y - c_T = 0$, bottom bounding line: $-r_y x + r_x y - c_B = 0$, left bounding line: $r_x x + r_y y - c_L = 0$ and right bounding line: $r_x x + r_y y - c_R = 0$.

Referring to FIG. 1, the bounding-line intersector 16 may compute bounding page corners 17 by intersecting the fitted bounding lines 15 and inverting the down-sampling operation performed by the image preconditioner 8. The coordinates of the top-left corner, the top-right corner, the bottom-left corner and the bottom-right corner, which may be denoted TL, TR, BL and BR, respectively, may be determined by the linear system:

$MC=P$, where $$M = \begin{bmatrix} -r_y & r_x \\ r_x & r_y \end{bmatrix}, \quad C = \begin{bmatrix} TL_x & TR_x & BL_x & BR_x \\ TL_y & TR_y & BL_y & BR_y \end{bmatrix} \text{ and}$$

$$P = \begin{bmatrix} c_T & c_T & c_B & c_B \\ c_L & c_R & c_L & c_R \end{bmatrix}.$$

The bounding corners 17 may be determined from TL, TR, BL and BR by scaling these coordinates to the coordinate system of the input image 5. The scaling may comprise inverting the down-sampling operation performed by the image preconditioner 8. The bounding corners 17 in the input image coordinate system define the document cropping rectangle.

Figure 5:
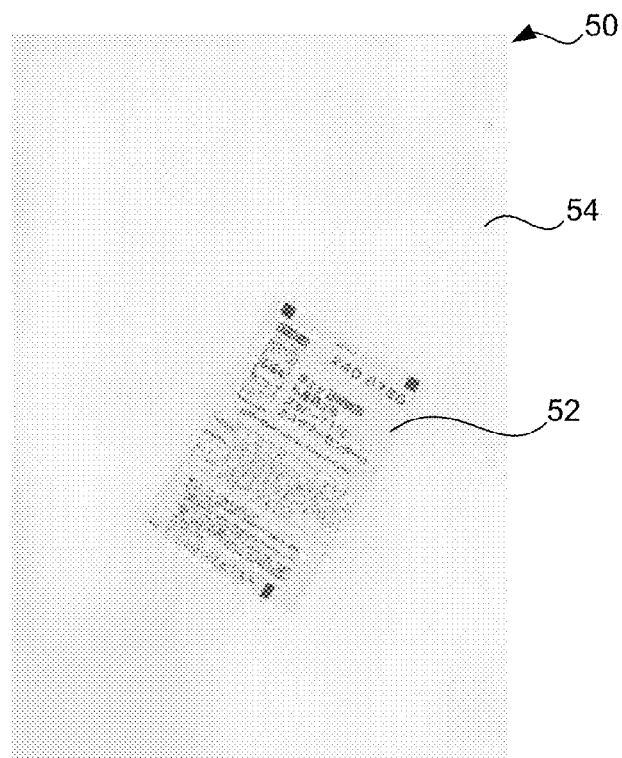
FIG. 5 is a picture depicting a blue-channel extraction, according to embodiments of the present invention, of an exemplary input image.
Figure 6:
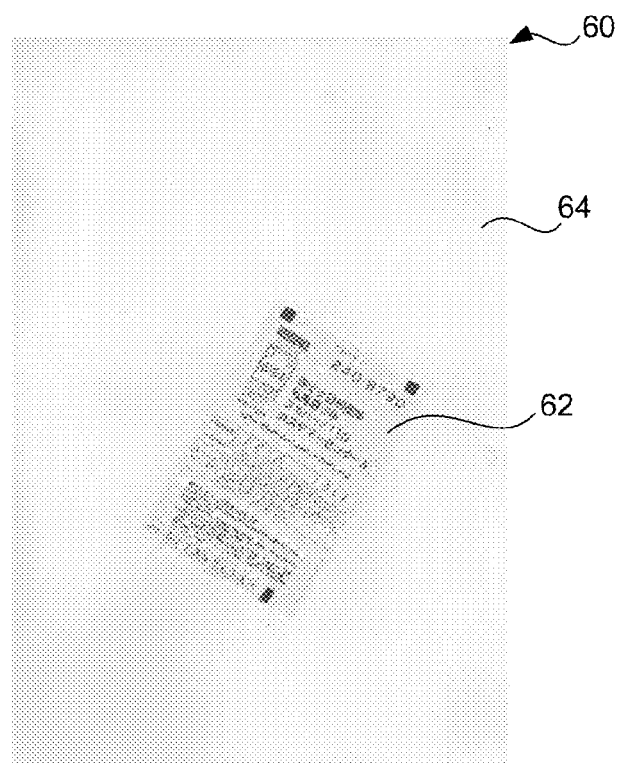
FIG. 6 is a picture depicting a gamma stretched version of the blue-channel image shown in FIG. 5.
Figure 7:
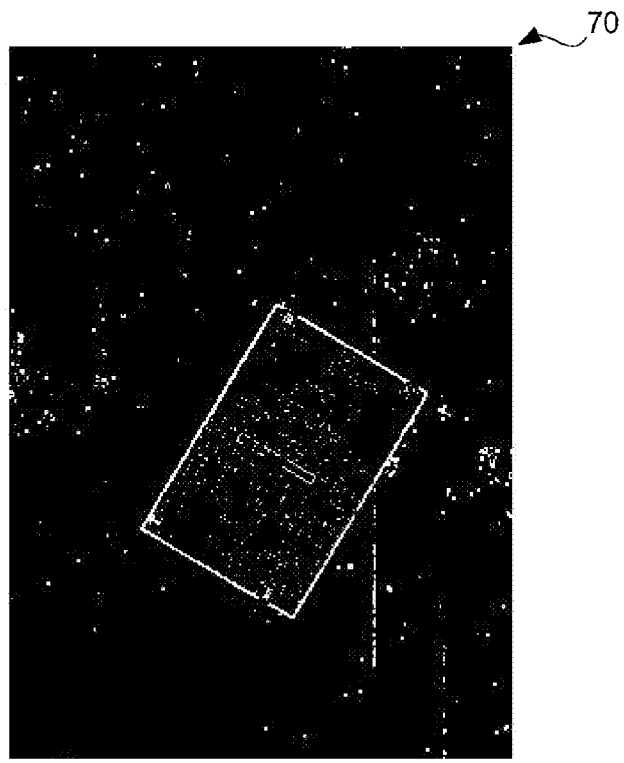
FIG. 7 is a picture depicting the results, according to embodiments of the present invention, of bracket filtering the normalized image associated with FIG. 5.
Figure 8:
FIG. 8 is a picture depicting the filtered local density, determined according to embodiments of the present invention, of the image shown in FIG. 7.
Figure 9:
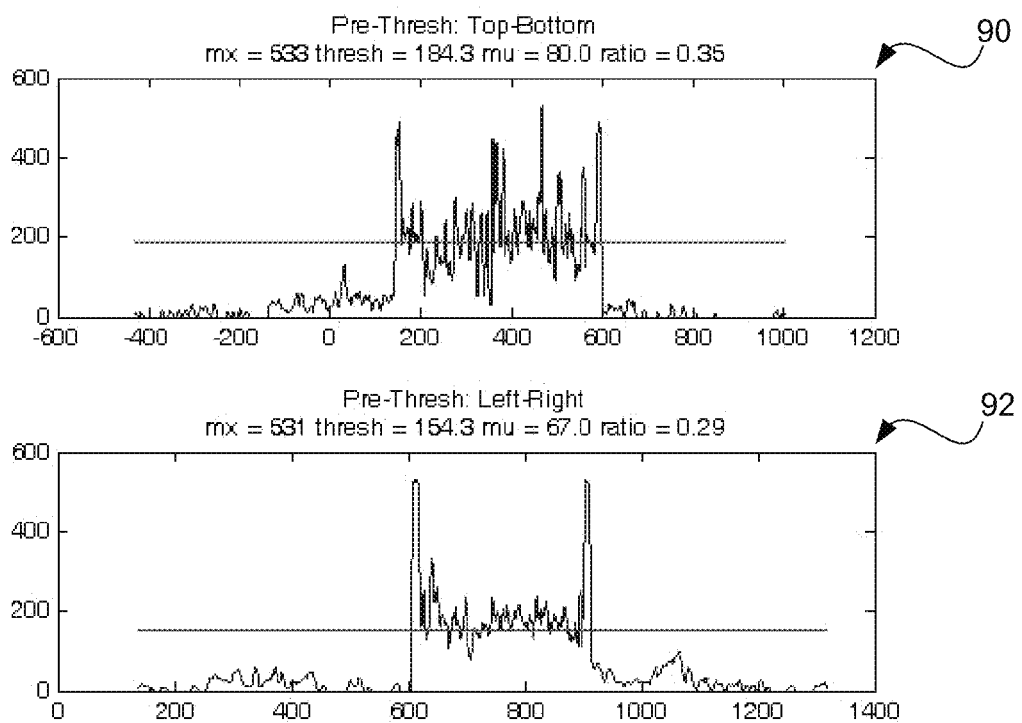
FIG. 9 is a picture of exemplary projection histograms determined according to embodiments of the present invention.
Figure 10:
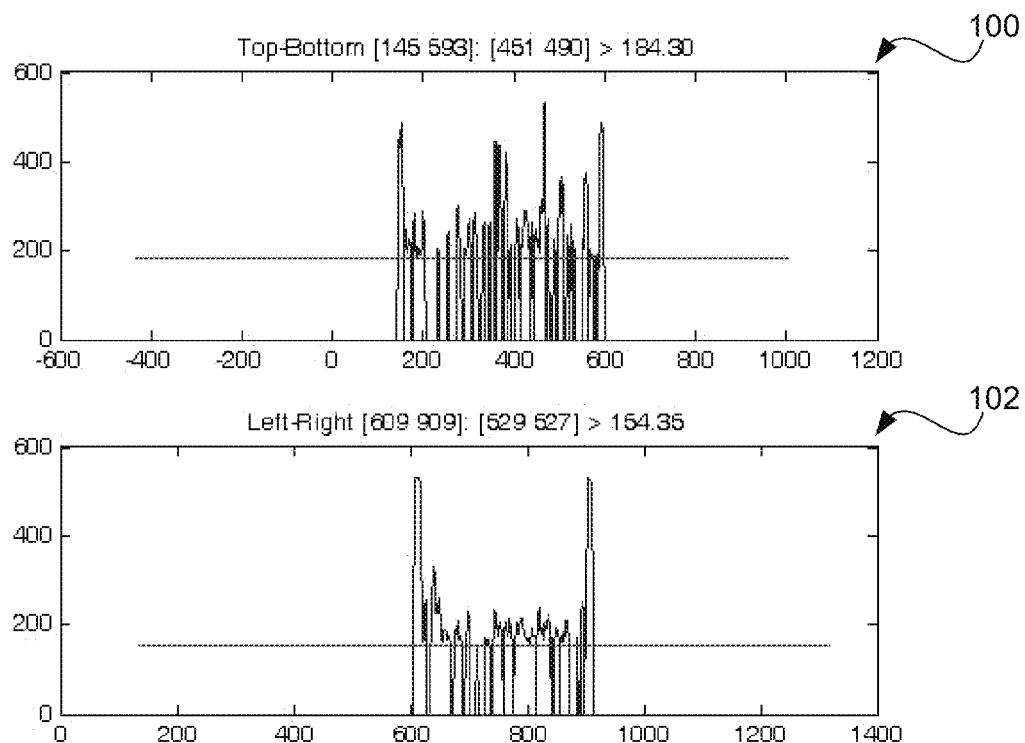
FIG. 10 is a picture of exemplary thresholded projection histograms determined according to embodiments of the present invention.
Figure 11:
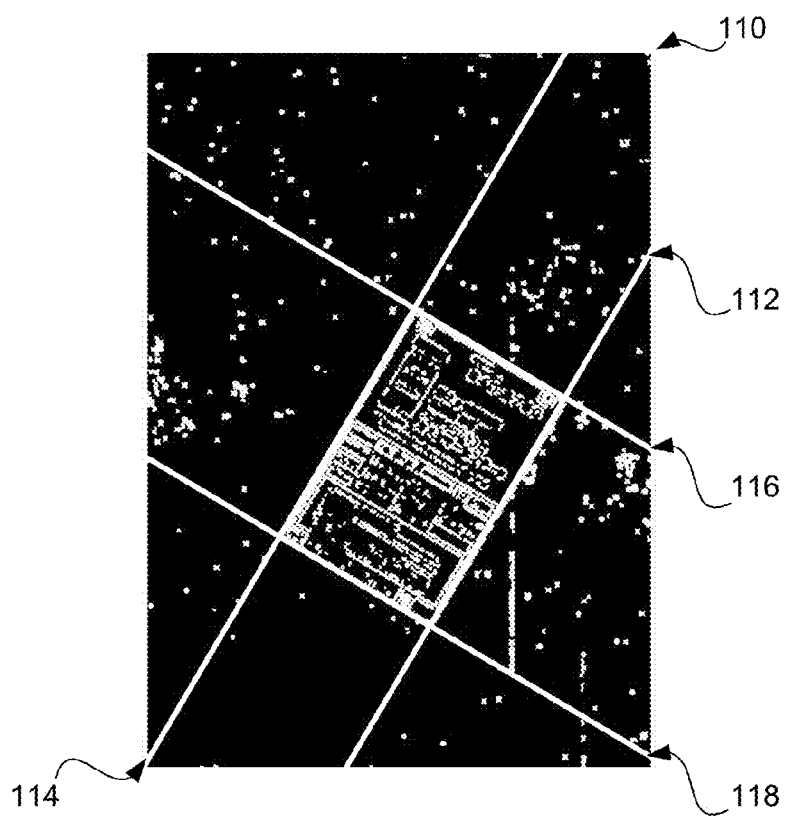
FIG. 11 is a picture depicting content boundaries, determined according to embodiments of the present invention, for the exemplary image associated with FIG. 5.
Figure 12:
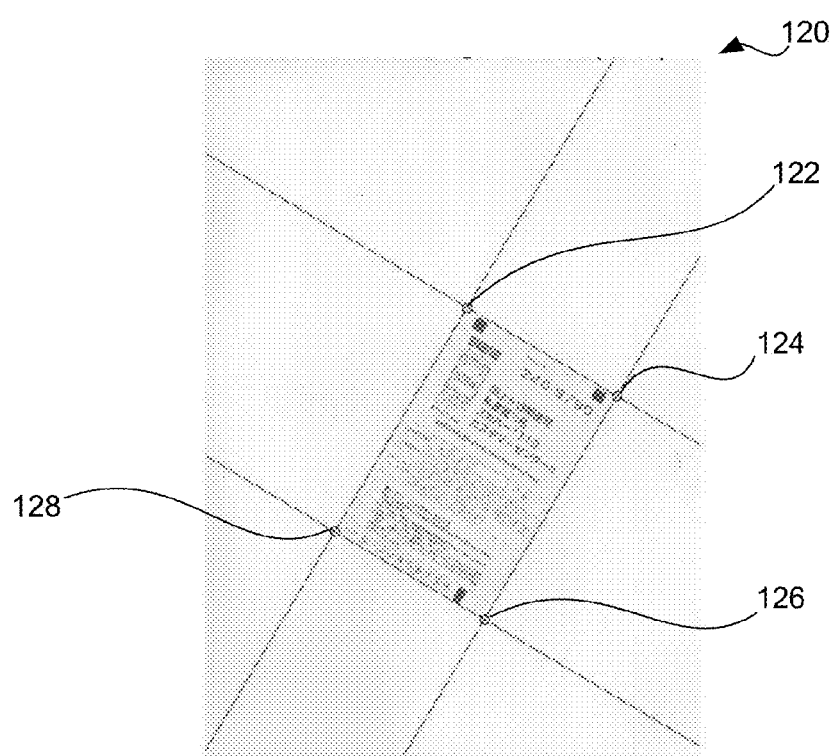
FIG. 12 is a picture depicting intersecting corners, determined according to embodiments of the present invention, of the content boundaries shown in FIG. 11.

FIGS. 5 through 10 show exemplary results according to embodiments of the present invention. FIG. 5 and FIG. 6 show exemplary images 50, 60 resulting from image preconditioning according to embodiments of the present invention. FIG. 5 depicts a blue-channel image 50 associated with a document scanned by an imaging device. The blue-channel image 50 consists of an image region 52 corresponding to the document and an image region 54 corresponding to the platen cover. FIG. 6 depicts a gamma-stretched image 60 corresponding to gamma stretching the blue-channel image 50 with a gamma value of two. The gamma-stretched image 60 consists of the image region 62 and the platen-cover region 64. FIG. 7 shows an image 70 resulting from bracket filtering the preconditioned image 60 shown in FIG. 6 according to embodiments of the present invention, and FIG. 8 shows a filtered local-density image 80 associated with the bracket-filtered results 70. FIG. 9 depicts projection histograms 90, 92 corresponding to the density data 80 shown in FIG. 8. FIG. 10 depicts projection histograms 100, 102 resulting from thresholding the projection histograms 90, 92 of FIG. 8 according to embodiments of the present invention. FIG. 11 shows an image 110 comprising the resulting oriented lines 112, 114, 116, 118 overlaid on the image shown in FIG. 8. FIG. 12 depicts an image 120 showing the intersecting corners 122, 124, 126, 128 of the oriented lines shown in FIG. 11.

Figure 13:
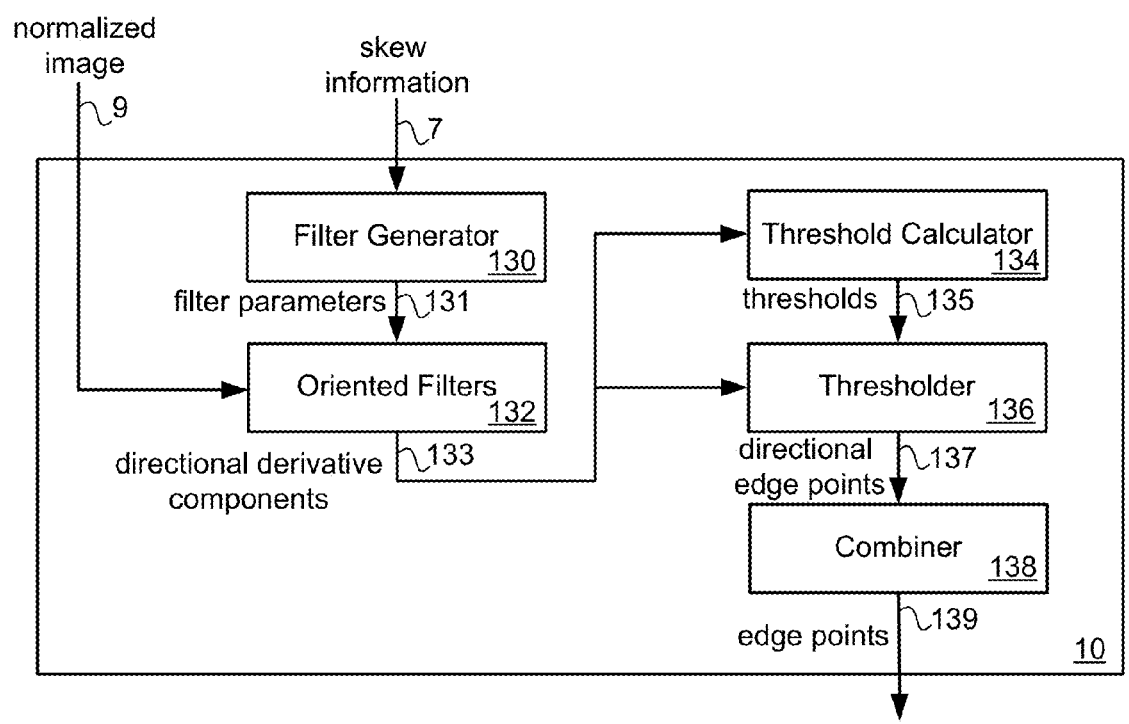
FIG. 13 is a chart showing exemplary embodiments of the present invention comprising oriented local differencing filters tuned to the angle of a rotation vector and its normal.

In some alternative embodiments of the present invention described in relation to FIG. 1, the edge detector 10 may comprise an oriented-edge detector. An exemplary oriented-edge detector is shown in FIG. 13. In these embodiments, the edge detector 10 may comprise oriented local differencing filters which may be tuned to the angle of the rotation vector associated with the document skew and the normal of the rotation vector. In some embodiments, the oriented local differencing filters may be constructed at runtime. In alternative embodiments, they may be selected from a pre-computed set of filters. In some oriented-edge detector embodiments, skew information 7 may be made available to the edge detector 10 wherein the skew information may be used by a filter generator 130 to generate filter parameters 131. The filter parameters 131 may be associated with filter kernels that produce a maximum response for an extended image-content edge at the corresponding angle. The filter parameters 131 may be made available to one, or more, oriented filters 132 which filter the normalized image 9 producing directional-derivative components 133. In some embodiments, the filters may comprise a first-derivative Gaussian filter constructed at the angle of the rotation vector that describes the document skew and a first-derivative Gaussian filter constructed at the angle of the normal to the rotation vector that describes the document skew. In some of these embodiments, a value of 1 and a value of 4.5 may be used for the cross-edge and the along-edge filter sigmas, respectively, and the kernels may be of size 39×39. The directional-derivative components 133 may be made available to a threshold calculator 134 for calculating thresholds to be used to threshold the directional-derivative components 133. In some embodiments, the directional-derivative components 133 may be thresholded on magnitude. In some of these embodiments, assuming that the edge magnitudes may be approximately exponentially distributed, a threshold for each component may be determined according to:

$$\theta_x = -\mu(|D_x|) \cdot \log(1-p)$$

and $$\theta_y = -\mu(|D_y|) \cdot \log(1-p),$$

where $D_x$ and $D_y$ are the direction-derivative components produced by the filters associated with the rotation vector and its normal, respectively, $\mu(|\cdot|)$ denotes the mean of the absolute value of a component and p is an adjustable parameter associated with the strength of the threshold for rejecting weak edges. In some embodiments of the present invention, the value of p may be set to p=0.95. The thresholds 135 and the directional derivative components 133 may be made available to a thresholder 136, and the component magnitudes may be thresholded according to:

$$D_x^{thresh} = \begin{cases} 1, & |D_x| > \theta_x \\ 0, & \text{otherwise} \end{cases}$$

and $$D_y^{thresh} = \begin{cases} 1, & |D_y| > \theta_y \\ 0, & \text{otherwise.} \end{cases}$$

The resulting directional edge points 137 may be made available to a combiner 138 which may combine the component results 137 into edge points 139. In some embodiments, the component results 137 may be combined using a logical operation, for example, an OR operation. In alternative embodiments, each component edge point my be projected using the corresponding vector, for example, a component edge point produced using a kernel associated with the rotation vector may be projected using the rotation vector, and a component edge point produced using a kernel associated with the normal to the rotation vector may be projected using the normal vector.

Figure 14A:
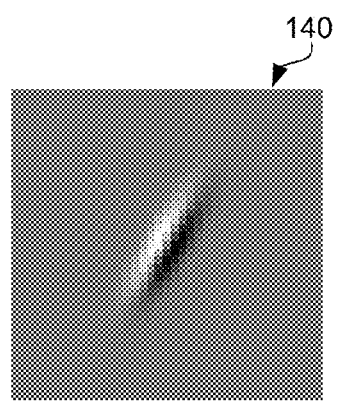
FIG. 14 is a picture showing exemplary oriented local differencing filters.
Figure 14B:
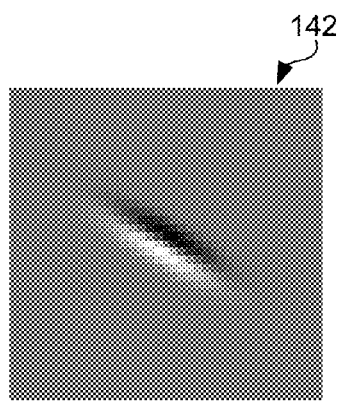
Figure 15A:
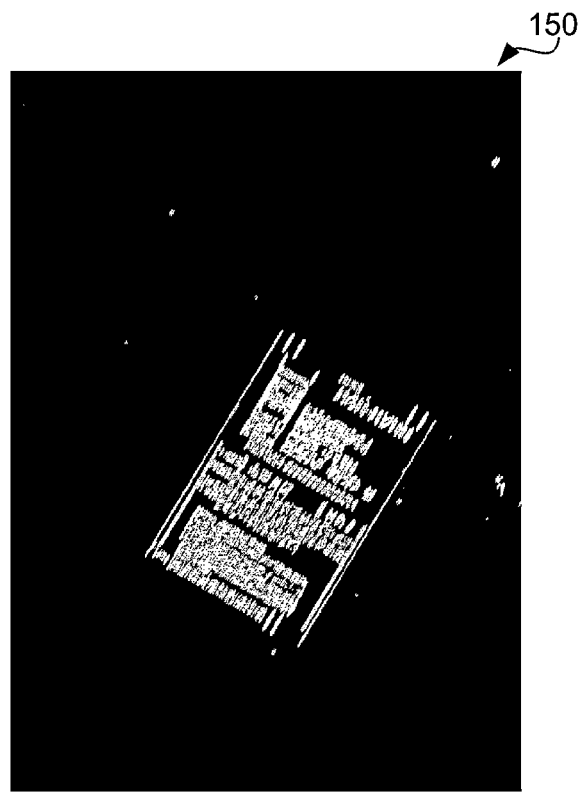
FIG. 15 is a picture showing edge detection results according to embodiments of the present invention using the exemplary filters shown in FIG. 14.
Figure 15B:
Figure 16:
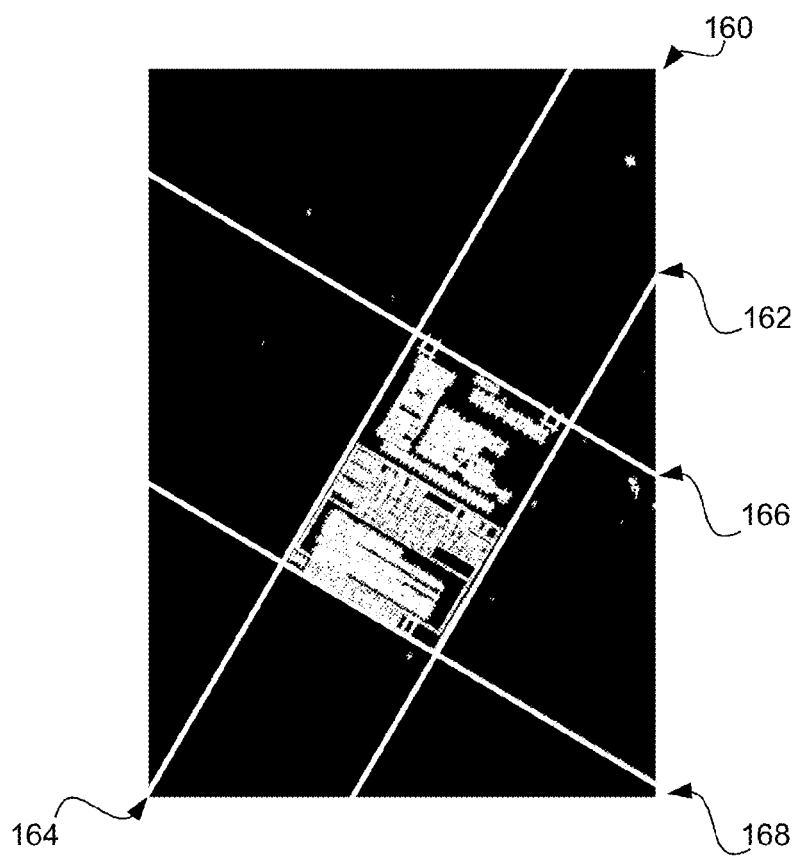
FIG. 16 is a picture depicting content boundaries determined according to embodiments of the present invention comprising oriented local differencing filters.
Figure 17:
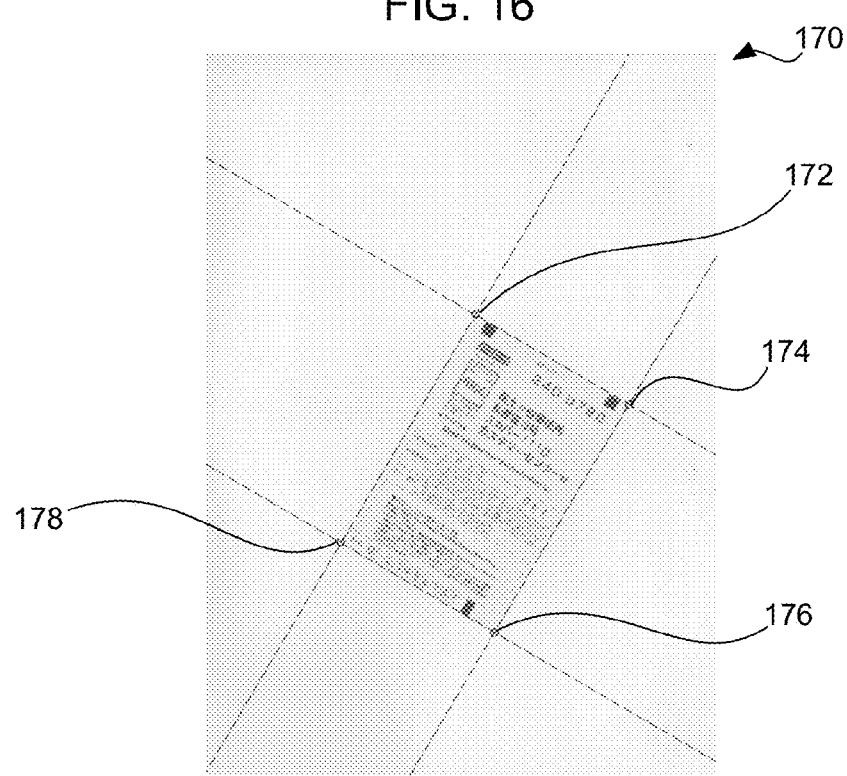
FIG. 17 is a picture depicting intersecting corners, determined according to embodiments of the present invention, of the content boundaries shown in FIG. 16.

FIGS. 14A and 14B depict exemplary oriented filters 140, 142 associated with the input image corresponding to FIG. 5. FIGS. 15A and 15B depict the edge results 150, 152 using the oriented kernels 140, 142 shown in FIGS. 14A and 14B, respectively. FIG. 16 shows an image 160 comprising the combined edge results from FIGS. 15A and 15B overlaid with the bounding lines 162, 164, 166, 168. FIG. 17 is an image 170 showing the intersecting corners 172, 174, 176, 178 of the bounding lines 162, 164, 166, 168 shown in FIG. 16.

Alternative embodiments of the present invention may comprise a method executed in a computing system comprising at least one computing device. Some of these embodiments described in relation to FIG. 18 may comprise receiving 180 an input image and skew information in a computing system and preconditioning 182 the input image to a normalized format. The location of edges in the normalized, also considered preconditioned, image may be determined 184 and projection histograms formed 186 based on the edges and the skew information. The projection histograms and edge points may be used to estimate 188 oriented boundaries which may be used to determine 190 bounding corners and bounding lines.

Figure 18:
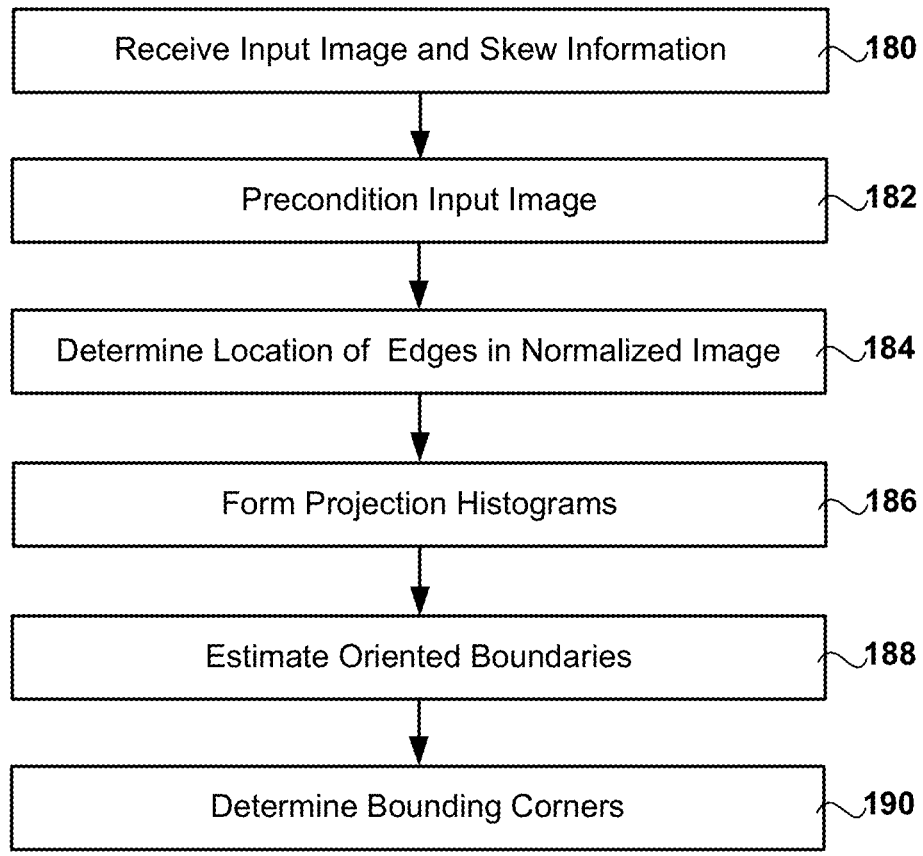
FIG. 18 is a chart showing exemplary embodiments of the present invention comprising receiving an input image and skew information, precondition the input image, determining the location of edges in the normalized image, forming projection histograms, estimating oriented boundaries and determining bounding corners.
Figure 19:
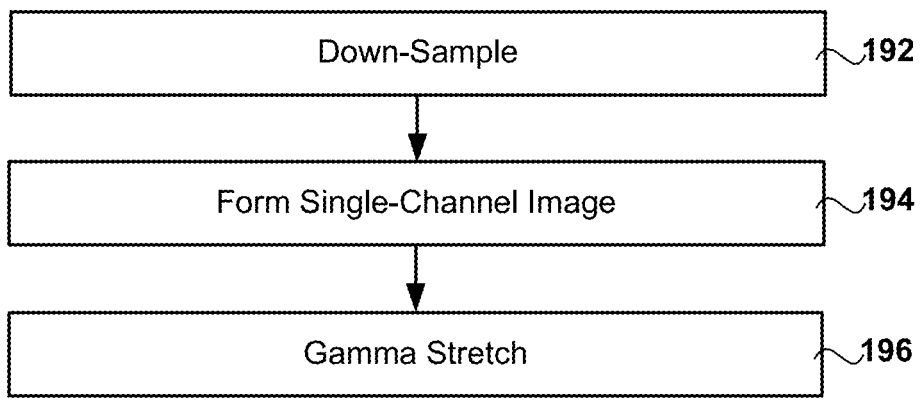
FIG. 19 is a chart showing exemplary embodiments of the image preconditioning shown in FIG. 18.

In some embodiments of the present invention described in relation to FIG. 18 and FIG. 19, preconditioning 182 an input image may comprise down-sampling 192, forming a single-channel image 194 and gamma stretching 196. In some of these embodiments, an input image may be down-sampled during down-sampling 192, for example, from a resolution of 300 DPI to a resolution of 75 DPI. A single channel, for example, the blue channel or the luminance channel, may be extracted to form 194 a single-channel image for further processing. The single-channel image may be gamma stretched, for example, to a gamma value of two, during gamma stretching 196 to increase the discriminative range of the content-portion of the input image and to form a normalized image. Although the chart of FIG. 19 shows a specific order of execution, it is understood that the order of execution may differ from that which is depicted. For example, the order of execution of the blocks may be changed relative to the shown order. Also, as a further example, two or more blocks shown in succession in the figure may be executed concurrently, or with partial concurrence. It is understood by those with ordinary skill in the art that software, hardware and/or firmware may be created by one of ordinary skill in the art to carry out the various logical functions described herein.

Figure 20:
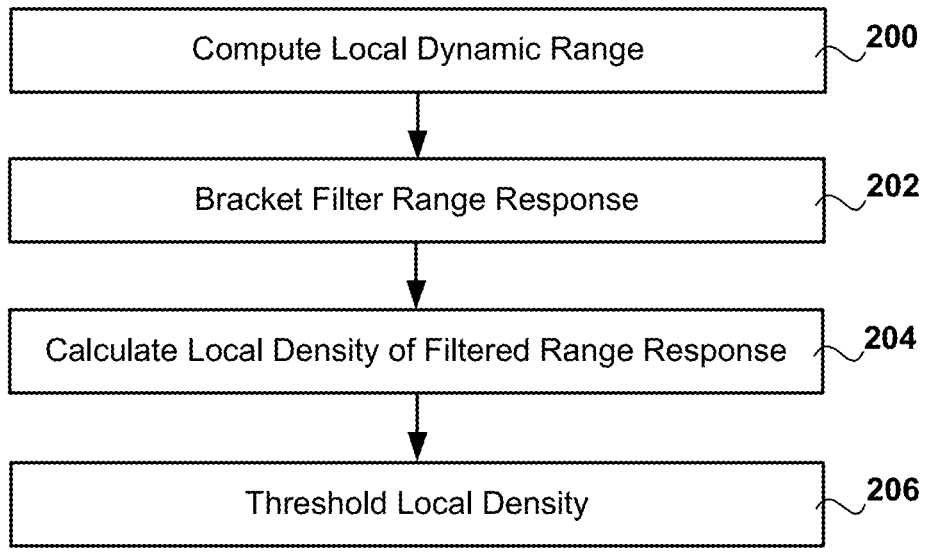
FIG. 20 is a chart showing exemplary embodiments of the present invention non-oriented edge detection.

Referring to FIG. 18 and FIG. 20, in some embodiments of the present invention, determining 184 the location of edges in a normalized image may comprise determining the location of non-oriented edges by computing 200 the local dynamic range at each pixel in a normalized image formed by preconditioning 182 an input image. At each pixel location in the normalized image, the dynamic range of a local neighborhood associated with the pixel location, which may be denoted (i, j), may be determined according to:

$$rng_N(i,j) = \max(p) - \min(p), \forall p \in N,$$

where N denotes the local neighborhood, for example, a 5×5 neighborhood centered on the pixel location for which the dynamic range is being determined and p denotes an image value at a pixel. A range response comprising the local dynamic range determined at each pixel in the normalized image may be bracket filtered 202. Bracket filtering 202 may retain only significant range values from the range response to generate a filtered range response from which a local-density value may be calculated 204. Range values below a lower threshold value may reflect quasi-uniform regions, and may be considered non-edges. Range values above an upper threshold may likely be the result of document image content or markings on the platen backing, in the case of a scanned image, and may be stronger than an expected range for a document boundary transition. In some embodiments of the present invention comprising a 5×5 neighborhood for dynamic-range calculation, bracket filtering 202 may be realized according to:

$$rng'(i, j) = \begin{cases} 1, & 7 \le rng_N(i, j) \le 30 \\ 0, & \text{otherwise,} \end{cases}$$

where rng'(i, j) may denote the filtered range response at pixel location (i, j). In general, bracket filtering 202 may be realized according to:

$$rng'(i,j) = \begin{cases} 1, & TH_{lower} \le rng_N(i,j) \le TH_{upper} \\ 0, & \text{otherwise,} \end{cases}$$

where $TH_{lower}$ and $TH_{upper}$ may denote a lower threshold and an upper threshold, respectively. The threshold values may be based on the neighborhood configuration used to compute 200 the local-dynamic range. The filtered range response may be used to compute 204 the local density of significant range values. A neighborhood proximate to a pixel location (i, j) may be used to determine 204 the local density. In some embodiments, the neighborhood may be the same neighborhood used to compute 200 the local dynamic range. In alternative embodiments, the neighborhood may a different neighborhood than that used to compute 200 the local dynamic range. For a given neighborhood, which may be denoted $N_{LD}$, the local density at a pixel location (i, j) may be determined according to:

$$den_N(i,j) = \sum_{\forall p \in N_{LD}} rng'(p).$$

In some embodiments, the local-density neighborhood, $N_{LD}$, may be a 5×5 window centered on the pixel for which the local density is being calculated. The local density values may be thresholded 206 to retain only points of sufficient density. Points of sufficient density may comprise points with sufficient local support to be likely document-boundary transitions. The thresholded response, also considered edge points at a pixel location (i, j) may be determined according to:

$$den'_{N_{LD}}(i,j) = \begin{cases} 1, & den_{N_{LD}}(i,j) > \mu \\ 0, & \text{otherwise,} \end{cases}$$

where $\mu$ may denote a density threshold. In some embodiments of the present invention, the density threshold may be the mean of the global density or another function of the global density. In alternative embodiments, the local density at a pixel location (i, j) may be determined only at those pixel locations (i, j) where rng'(i, j)=1. These embodiments may have less computation cost at the expense of performance. Still alternative embodiments (not shown) the filtered range response may be directly used as edge points. Thus, in these alternative embodiments, the edge detection does not comprise calculation of the local density 204 or thresholding 206 of the local density.

Figure 21:
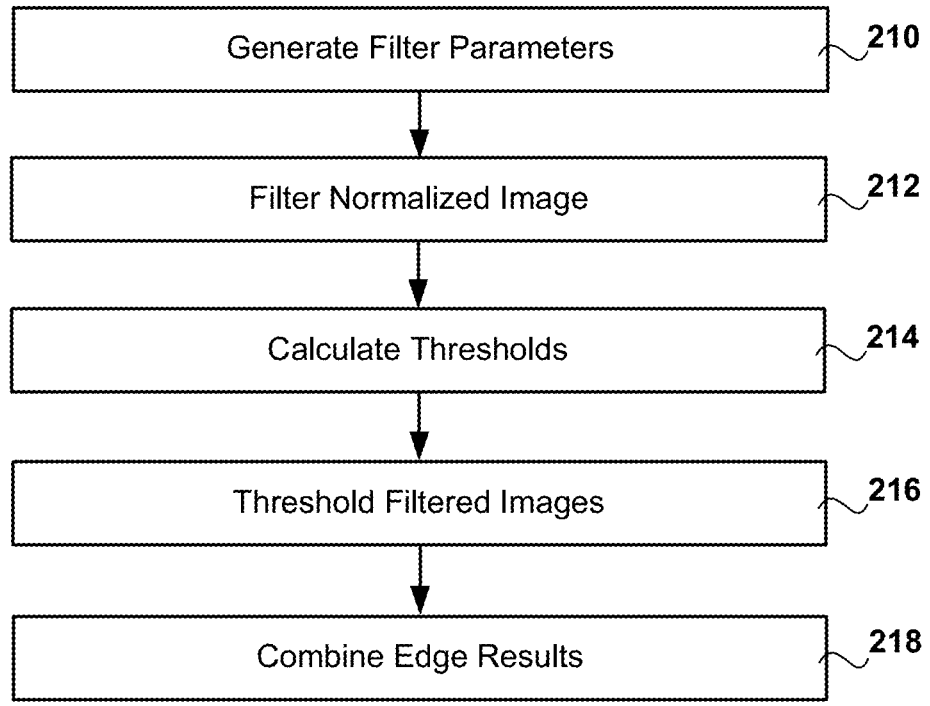
FIG. 21 is a chart showing exemplary embodiments of the present invention comprising oriented local difference filtering.

In some alternative embodiments of the present invention described in relation to FIG. 18, the determining 184 of edge locations may comprise oriented-edge detection. In these embodiments, the edge detection 184 may comprise oriented local differencing filtering wherein the difference filters may be tuned to the angle of the rotation vector associated with the document skew and the normal of the rotation vector. In some embodiments, the oriented local differencing filters may be constructed at runtime. In alternative embodiments, the filters may be selected from a pre-computed set of filters. The filter parameters may be associated with filter kernels that produce a maximum response for an extended image-content edge at the corresponding angle. In some embodiments of the present invention shown in relation to FIG. 21, filter parameters may be generated 210, the normalized image may be filtered 212 according to filters comprising the generated 210 filter parameters producing directional-derivative components. In some embodiments, the filters may comprise a first-derivative Gaussian filter constructed at the angle of the rotation vector that describes the document skew and a first-derivative Gaussian filter constructed at the angle of the normal to the rotation vector that describes the document skew. In some of these embodiments, a value of 1 and a value of 4.5 may be used for the cross-edge and the along-edge filter sigmas, respectively, and the kernels may be of size 39×39. Thresholds may be calculated 214, from the directional-derivative components, to be used to threshold 216 the directional-derivative components. In some embodiments, the directional-derivative components may be thresholded 216 on magnitude. In some of these embodiments, assuming that the edge magnitudes may be approximately exponentially distributed, a threshold for each component may be determined 214 according to:

$$\theta_x = -\mu(|D_x|) \cdot \log(1-p)$$

and $$\theta_y = -\mu(|D_y|) \cdot \log(1-p),$$

where $D_x$ and $D_y$ are the direction-derivative components produced by the filters associated with the rotation vector and its normal, respectively, $\mu(|\bullet|)$ denotes the mean of the absolute value of a component and p is an adjustable parameter associated with the strength of the threshold for rejecting weak edges. In some embodiments of the present invention, the value of p may be set to p=0.95. The component magnitudes may be thresholded 216 according to:

$$D_x^{thresh} = \begin{cases} 1, & |D_x| > \theta_x \\ 0, & \text{otherwise} \end{cases}$$

and $$D_y^{thresh} = \begin{cases} 1, & |D_y| > \theta_y \\ 0, & \text{otherwise.} \end{cases}$$

The resulting directional edge points may be combined 218 into edge points. In some embodiments, the component results may be combined 218 using a logical operation, for example, an OR operation. In alternative embodiments, each component edge point my be projected using the corresponding vector, for example, a component edge point produced using a kernel associated with the rotation vector may be projected using the rotation vector, and a component edge point produced using a kernel associated with the normal to the rotation vector may be projected using the normal vector.

Referring to FIG. 18, projection histograms may be formed 186 using the edge points and the received 180 skew information. A projection histogram may be formed 186 in each of the directions indicated by the skew information. Denoting the skew information as an input rotation vector and its normal, rvec=$[r_x\ r_y]$ and vvec=rvec$^\perp$=$[-r_y\ r_x]$, respectively, then a point vector of all possible boundary locations may be given by:

$$pvec = [(xy)^T | den'(x,y) = 1].$$

A top-bottom projection and a left-right projection of a point may be computed according to:

$$TB_{proj} = vvec \otimes pvec$$

and $$LR_{proj} = rvec \otimes pvec,$$

respectively, where ⊗ denotes matrix multiplication. A top-bottom boundary histogram and a right-left boundary histogram may be computed 186 by accumulating the projection values. The projection histograms may be used to estimate 188 oriented boundaries.

Figure 22:
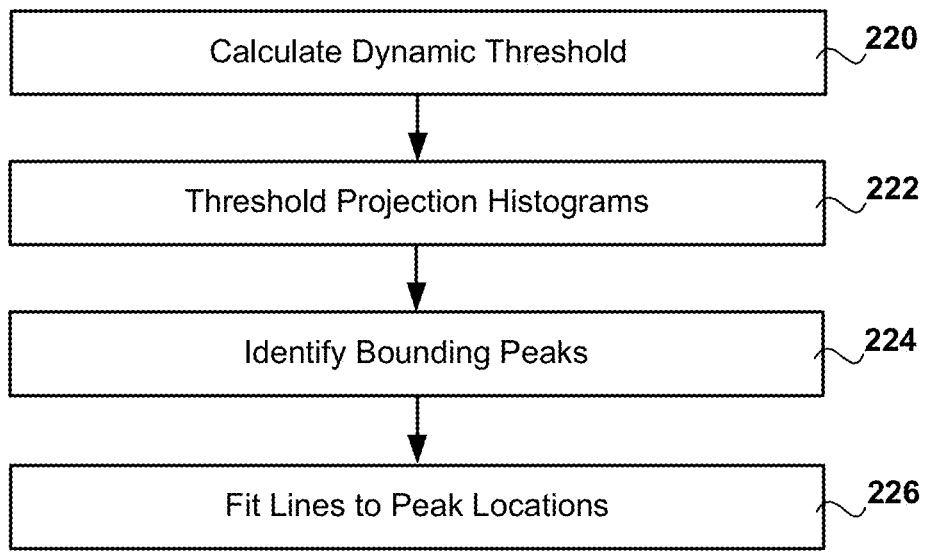
FIG. 22 is a chart showing exemplary embodiments of the present invention wherein a content boundary may be determined from a thresholded projection histogram.

Referring to FIG. 18 and FIG. 22, boundary estimation 188 may comprise calculating 220 a dynamic threshold associated with each projection histogram to suppress non-documents peaks in the projection histogram. In some embodiments of the present invention, the threshold associated with a projection histogram may be a function of the mean of the projection-histogram counts and the global density ratio. In some of these embodiments, the threshold associated with the top-bottom-boundary projection histogram may be determined according to:

$$\theta_{TB} = \gamma \cdot \mu_{TB} \cdot \log(\Delta),$$

and the threshold associated with the left-right-boundary projection histogram may be determined according to:

$$\theta_{LR} = \gamma \cdot \mu_{LR} \cdot \log(\Delta),$$

where $\mu_{TB}$ and $\mu_{LR}$ may denote the respective mean histogram counts and where $$\gamma = 0.8,$$

in an exemplary embodiments, and $$\Delta = \frac{\sum_{\forall pixels} den' = 1}{\sum_{\forall pixels} den' = \{0, 1\}}.$$

A calculated dynamic threshold may be used to threshold 222 a projection histogram thereby suppressing values below the associated threshold by setting to zero the count of any histogram bin with a count below the threshold. Significant bounding peaks may be identified 224 in each of the thresholded projection histograms. A top peak may be identified by locating the first, also considered leading, locally maximum bin in the thresholded top-bottom-boundary projection histogram. A left peak may be identified by locating the first, also considered leading, locally maximum bin in the thresholded left-right-boundary projection histogram. A bottom peak may be identified by locating the last, also considered trailing, locally maximum bin in the thresholded top-bottom-boundary projection histogram. A right peak may be identified by locating the last, also considered trailing, locally maximum bin in the thresholded left-right-boundary projection histogram. A leading local maximum bin may be a bin for which the bin count is larger than that of any preceding bin and for which there is at least one succeeding bin with a smaller count before there is a larger count. A trailing local maximum bin may be identified processing the histogram signal in the reverse order using the same process. In some embodiments, a first derivative may be computed for a histogram. A leading peak may be associated with the first bin where the derivative is negative. A trailing bin may be associated with the last bin where the derivative changes from positive to negative. The top, bottom, left and right peak locations may be denoted by $c_T$, $c_B$, $c_L$ and $c_R$, respectively. Bounding lines may fit 226 to the identified peak locations using the received skew information. In some embodiments, the bounding lines may be determined according to:

top bounding line: $-r_y x + r_x y - c_T = 0$, bottom bounding line: $-r_y x + r_x y - c_B = 0$, left bounding line: $r_x x + r_y y - c_L = 0$ and right bounding line: $r_x x + r_y y - c_R = 0$.

Referring to FIG. 18, bounding page corners may be determined 190 by intersecting the fitted bounding lines and inverting the down-sampling operation performed during image preconditioning 182. The coordinates of the top-left corner, the top-right corner, the bottom-left corner and the bottom-right corner, which may be denoted TL, TR, BL and BR, respectively, may be determined by the linear system:

$$MC = P,$$

where $$M = \begin{bmatrix} -r_y & r_x \\ r_x & r_y \end{bmatrix}, \quad C = \begin{bmatrix} TL_x & TR_x & BL_x & BR_x \\ TL_y & TR_y & BL_y & BR_y \end{bmatrix} \text{ and}$$

$$P = \begin{bmatrix} c_T & c_T & c_B & c_B \\ c_L & c_R & c_L & c_R \end{bmatrix}.$$

The bounding corners may be determined from TL, TR, BL and BR by scaling these coordinates to the coordinate system of the input image. The scaling may comprise inverting the down-sampling operation performed during the image preconditioning 182. The bounding corners in the input image coordinate system may define the document cropping rectangle.

When documents are scanned or copied with an automatic document feeder, the scan bar may be locked, and the document pages may be moved one-by-one pass the sensor by a transport mechanism, for example, a belt or other mechanism. Over time, a residual streaking in the transport direction may build up on the transport mechanism due to slippage, rubbing and/or other actions in the mechanism. Some embodiments of the present invention may accommodate for this residual streaking.

Figure 23:
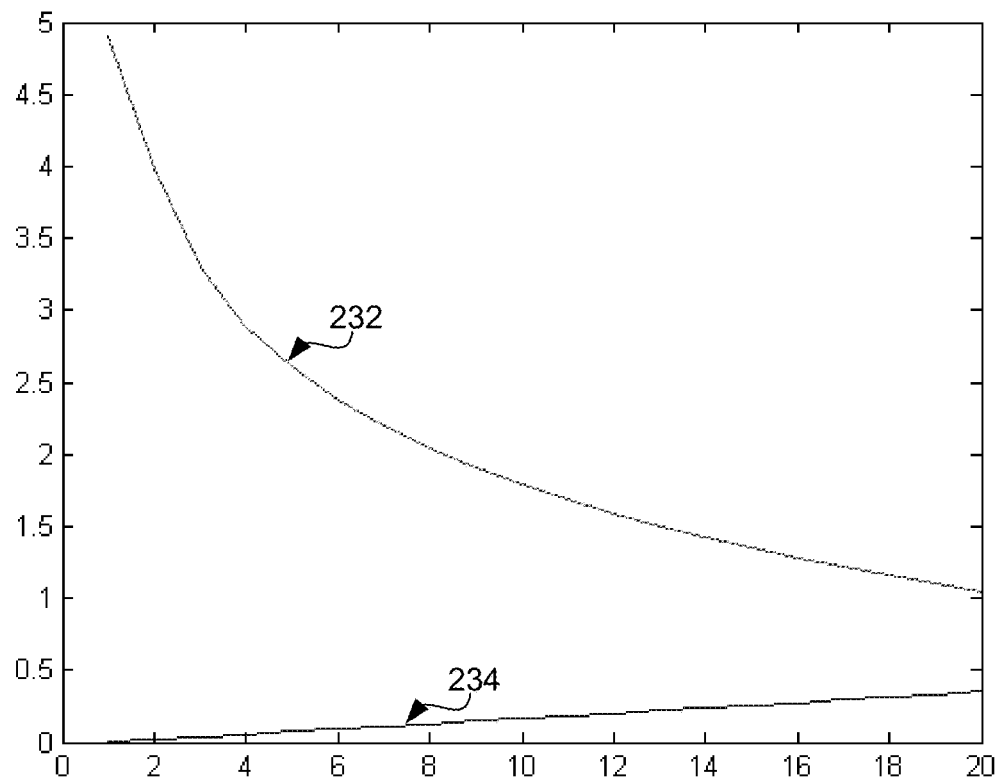
FIG. 23 is a plot showing sampled log curve according to embodiments of the present invention.

In these embodiments, the dynamic-threshold calculator 40, shown in FIG. 4, may provide a threshold that is dependent on the rotation angle. In particular, the threshold may decrease with increasing angle. Thus, the dynamic-threshold calculator 40 may provide a higher threshold when the skew information indicates that the document is aligned with the transport direction, thereby rejecting the streaks. As the angle increases, the dynamic-threshold calculator 40 generates a value approaching the value as in previously described embodiments. In some embodiments, the threshold value may be calculated based on a sampled log curve. FIG. 23 depicts an exemplary sampled curve 232. This exemplary sampled curve 232 is the negative log of a sequence of twenty small numbers 234 in the closed interval $$\left[ e^{\frac{-1}{50}}, e^{-1} \right].$$

The absolute value of the y-component of the rotation vector may be used to directly index the sampled curve, and a threshold value may be calculated according to:

$$\theta(\cdot) = \begin{cases} crv(|r_x|) \cdot \mu(\cdot), & |r_y| \leq 20 \\ \mu(\cdot), & \text{otherwise,} \end{cases}$$

where $\text{crv}(|r_y|)$ is the sampled curve valued indexed by rotational component $r_y$, $\mu(\bullet)$ the mean of a projection histogram and $\theta(\bullet)$ is the corresponding threshold.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for determining a content boundary in an image, said system comprising:
   an image receiver for receiving an image;
   a skew-information receiver for receiving a skew angle associated with said image;
   an image preconditioner for normalizing said image;
   an edge detector for detecting image-content edges in said normalized image;
   a projection-histogram generator for generating a first projection histogram of said detected image-content edges in a direction associated with said skew angle, wherein said projection-histogram generator:
      determines a point vector associated with a possible boundary location;
      determines an input rotation vector associated with said skew angle;
      computes a projection value using said point vector and said input rotation vector; and
      accumulates said projection value in said first projection histogram;
   a boundary estimator for determining a first content boundary from said first projection-histogram and said skew angle; and
   wherein said system is embodied in at least one system type selected from the group consisting of a hardware system, a firmware system and a non-transitory computer-readable medium.

2. The system as described in claim 1 further comprising a boundary-line intersector for determining a first intersection of said first content boundary and a second content boundary.

3. The system as described in claim 1, wherein said edge detector is a non-oriented edge detector.

4. The system as described in claim 3, wherein said non-oriented edge detector comprises:
   a dynamic-range calculator for calculating a local range response associated with said normalized image;
   a filter for filtering said local range response;
   a local-density calculator for calculating a local density associated with said local range response; and
   a thresholder for determining edge points from said local density.

5. The system as described in claim 1, wherein said boundary estimator determines a second content boundary from said first projection-histogram and said skew angle.

6. The system as described in claim 1 further comprising:
   a normal-angle determiner for determining a normal angle to said skew angle; and
   wherein:
      said projection-histogram generator generates a second projection histogram of said detected image-content edges in a direction associated with said normal angle; and
      said boundary estimator determines a third content boundary from said second projection histogram and said normal angle.

7. The system as described in claim 6, wherein said boundary estimator determines a fourth content boundary from said second projection-histogram and said normal angle.

8. The system as described in claim 7 further comprising a boundary-line intersector for:
   determining a first intersection between said first content boundary and said third content boundary;
   determining a second intersection between said first content boundary and said fourth content boundary;
   determining a third intersection between said second content boundary and said third content boundary; and
   determining a fourth intersection between said second content boundary and said fourth content boundary.

9. The system as described in claim 1, wherein said image preconditioner comprises:
   a down sampler;
   a channel extractor; and
   a gamma stretcher.

10. The system as described in claim 1, wherein said boundary estimator comprises:
    a dynamic-threshold calculator for calculating a first dynamic threshold based on said first projection histogram and said skew angle;
    a thresholder for thresholding said first projection histogram according to said first dynamic threshold;
    a bounding peak detector for detecting a first peak in said thresholded first projection histogram; and
    a line fitter for determining said first content boundary based on said first peak and said skew angle.

11. The system as described in claim 1, wherein:
    said edge detector comprises a filter for filtering said normalized image; and
    said filter is a local differencing filter tuned to said skew angle.

12. A method for determining a content boundary in an image, said method comprising:
    receiving an image in a computing system comprising at least one computing device;
    receiving, in said computing system, a skew angle associated with said image;
    normalizing said image;
    detecting image-content edges in said normalized image;
    generating a first projection histogram of said detected image-content edges in a direction associated with said skew angle, wherein said generating said first projection histogram comprises:
       determining a point vector associated with a possible boundary location;
       determining an input rotation vector associated with said skew angle;
       computing a projection value using said point vector and said input rotation vector; and
       accumulating said projection value in said first projection histogram; and
    determining a first content boundary from said first projection-histogram and said skew angle.

13. The method as described in claim 12 further comprising determining a first intersection of said first content boundary and a second content boundary.

14. The method as described in claim 12, wherein said detecting image-content edges uses a non-oriented edge detector.

15. The method as described in claim 14, wherein said non-oriented edge detector comprises:
    a dynamic-range calculator for calculating a local range response associated with said normalized image;
    a filter for filtering said local range response;

a local-density calculator for calculating a local density associated with said local range response; and a thresholder for determining edge points from said local density.

16. The method as described in claim 12 further comprising determining a second content boundary from said first projection-histogram and said skew angle.

17. The method as described in claim 12 further comprising:
   determining a normal angle to said skew angle;
   generating a second projection histogram of said detected image-content edges in a direction associated with said normal angle; and
   determining a third content boundary from said second projection histogram and said normal angle.

18. The method as described in claim 17 further comprising determining a fourth content boundary from said second projection-histogram and said normal angle.

19. The method as described in claim 18 further comprising:
   determining a first intersection between said first content boundary and said third content boundary;
   determining a second intersection between said first content boundary and said fourth content boundary;
   determining a third intersection between said second content boundary and said third content boundary; and
   determining a fourth intersection between said second content boundary and said fourth content boundary.

20. The method as described in claim 12, wherein said normalizing comprises:
   down sampling;
   channel extraction; and
   gamma stretching.

21. The method as described in claim 12 further comprising:
   calculating a first dynamic threshold based on said first projection histogram and said skew angle;
   thresholding said first projection histogram according to said first dynamic threshold;
   detecting a first peak in said thresholded first projection histogram; and
   determining said first content boundary based on said first peak and said skew angle.

22. The method as described in claim 12, wherein said detecting image-content edges comprises filtering said normalized image using a local differencing filter tuned to said skew angle.

* * * * *